S. Vanstone.
Nuts & Washer Making.
Nº 90,897. Patented Jun. 1, 1869.
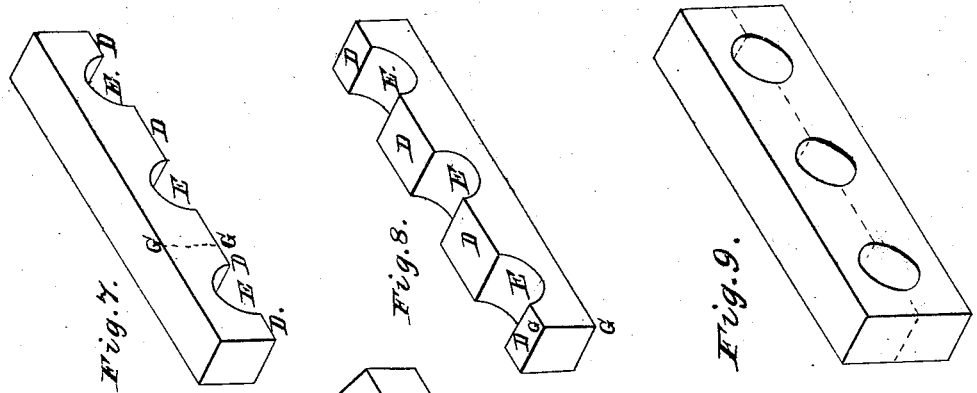
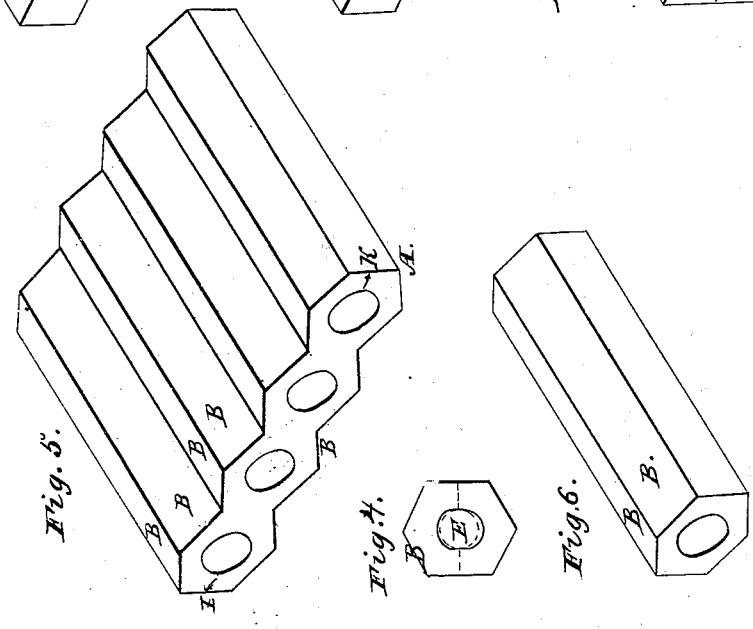
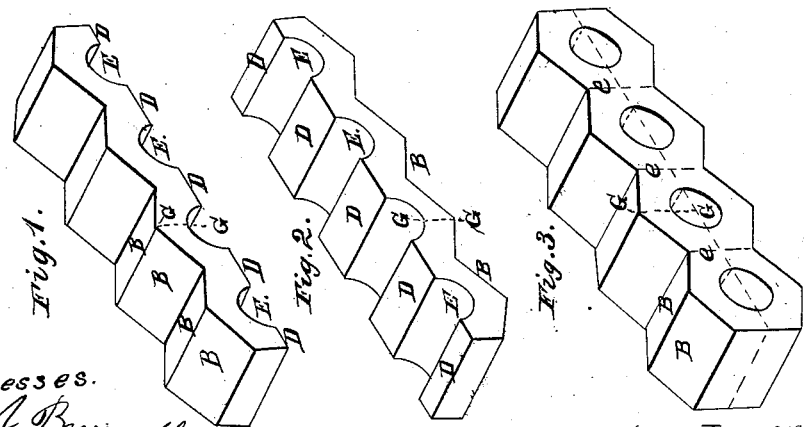
Witnesses.
Isaac A. Burwell
J. W. Howell
Inventor.
Samuel Vanstone

United States Patent Office.

SAMUEL VANSTONE, OF PROVIDENCE, RHODE ISLAND, ASSIGNOR TO HIMSELF AND JOHN W. HOARD, OF SAME PLACE.

Letters Patent No. 90,897, dated June 1, 1869.

IMPROVED NUT-BAR.

The Schedule referred to in these Letters Patent and making part of the same.

*To all whom it may concern:*

Be it known that I, SAMUEL VANSTONE, of the city and county of Providence, Rhode Island, have invented a new and useful Improvement in the Mode of Making Nuts; and I do hereby declare that the following is a full, clear, and exact description of the same, reference being had to the accompanying drawings, making part of this specification, in which—

Figures 1 and 2 represent, in two views, a section of the corrugated bar from which nuts are made according to my improved method;

Figure 3 represents the two bars placed together for welding;

Figure 4 represents a single section of the same;

Figure 5 represents the two bars welded together;

Figure 6 represents the single section welded together;

Figures 7 and 8 represent, in two views, a section of the corrugated bar for making square nuts; and Figure 9 represents the two bars placed together for welding.

Similar letters indicate corresponding parts in all the figures.

My invention consists in forming nuts from corrugated rods, bars, or masses of metal, by the rolling, welding, and dividing-process hereinafter described.

Heretofore nuts have been made by first punching a series of holes in a strip of cold metal, and afterwards punching the material around the holes from the strip, in the form of the required nut.

In another way, by first crimping the two edges of a heated strip or bar of metal, to form the angular sides of the nut, and afterwards, while held between compressing-jaws, punching the holes in the centre of the nut-shapes, and then clipping and separating the nuts from each other at the two adjoining faces.

And, in still another way, by boring or drilling a longitudinal hole in a square, hexagonal, or other-shaped bar of metal, and then cutting the same into lengths suitable for nuts.

All of these methods are, however, different from that herein proposed, and are, besides, inferior in point of perfection, rapidity of production, and economy of labor and waste of material.

By my method, the material is wrought, by the operations of rolling and welding, into a form or mass, which is susceptible of being divided or cut apart, while in a heated state, into sections or pieces, each of which constitutes a perfectly-formed nut, ready for use, the method embodying these several operations being such that the time occupied in working the material for a given number of nuts is shortened, the cost of the manufacture is cheapened, and the nuts thus produced are more perfect in respect to their shape, and the disposition of the material to resist the strain to which they are subjected in use.

To enable others skilled in the art to make use of my said invention, I will proceed to describe the same.

A flat bar of iron, of sufficient width to form the thickness of one or more nuts, placed endwise together, as, for instance, from A to A, fig. 5, and of thickness to form one-half the width of the nut, as from G to G, figs. 1, 2, 3, 7, and 8, is clipped into lengths convenient for working, as, for instance, that from I to K, fig. 5, and being heated properly, is passed between a set of two rollers, and shaped or corrugated in the form shown in figs. 1, 2, and 4, one of said rollers, for this purpose, being wrought with a series of angular grooves, that will form the angular faces B of the exterior of the nut, while the other roller is formed with a number of half-round beads or ridges, projecting from its cylindrical surface, midway between the two angular faces of each groove in the other roller, to form the half-oval groove E, which constitutes one-half of the bolt-hole in the nut, when completed, and the plane intervening surfaces D D, which are to be subsequently united to like surfaces of a similar-shaped bar, and for which purpose the said surface is roughened or scored by the roller, as represented in figs. 2 and 8, to facilitate the joining of the same together by welding.

In giving this shape, figs. 1 and 2, to the metal, I prefer that the angular faces and grooves be rolled crosswise of the grain or fibre of the iron, as it was originally drawn out in the bar, so that the fibres of the metal will be at right angles with the bore of the nut, and, by the subsequent rolling-operation, be wrapped around it, (the bore,) instead of lying parallel with it, whereby greater strength and exemption from bursting are obtained, than by any of the modes of manufacture heretofore practised, to my knowledge.

The bar being thus formed, two such are placed with their scored or roughened surfaces D D together, and after being heated to a welding-heat, are passed between a set of two other rollers, each of which is formed with angular-shaped grooves, arranged opposite each other, and, with a round rod or mandrel in each of the oval cavities, the two bars are welded together as one piece.

The hole or bore of the nut is shaped perfectly round, and the angular faces B of the exterior of the nut are regularly shaped with respect to each other.

The compound bar or mass being delivered from the rollers in the form shown in figs. 5 and 6, and while thus intensely heated, this bar or mass is carried to a gang of saws, mounted and operating in the usual way, for the purpose, and first divided laterally into strips or sticks of the thickness of the proposed nut, as shown in fig. 3, and these are again divided at the red lines *l l*, by which the nuts are separated and completed.

In making square nuts by this mode, the piece that is cut from the flat bar is first rolled crossways of the fibre, into the form shown in figs. 7 and 8, to form the groove for the hole or bore, and two such are afterwards placed together, as shown in fig. 9, and welded together by passing between two plain cylindrical rollers, after which the welded mass is divided laterally, and then longitudinally of the bar, in the manner before described, to separate the nuts in form from each other.

Having described my invention,

What I claim, and desire to secure by Letters Patent, is—

The compound nut-bar herein described, to be afterwards divided into nuts, substantially in the manner described.

In testimony whereof, I have hereunto subscribed my name, this 21st day of January, 1869.

SAMUEL VANSTONE.

Witnesses:
   ISAAC A. BROWNELL,
   J. W. HOARD.